Jan. 19, 1943.  P. W. THORNHILL  2,308,573
LANDING GEAR FOR AIRCRAFT
Filed April 6, 1940
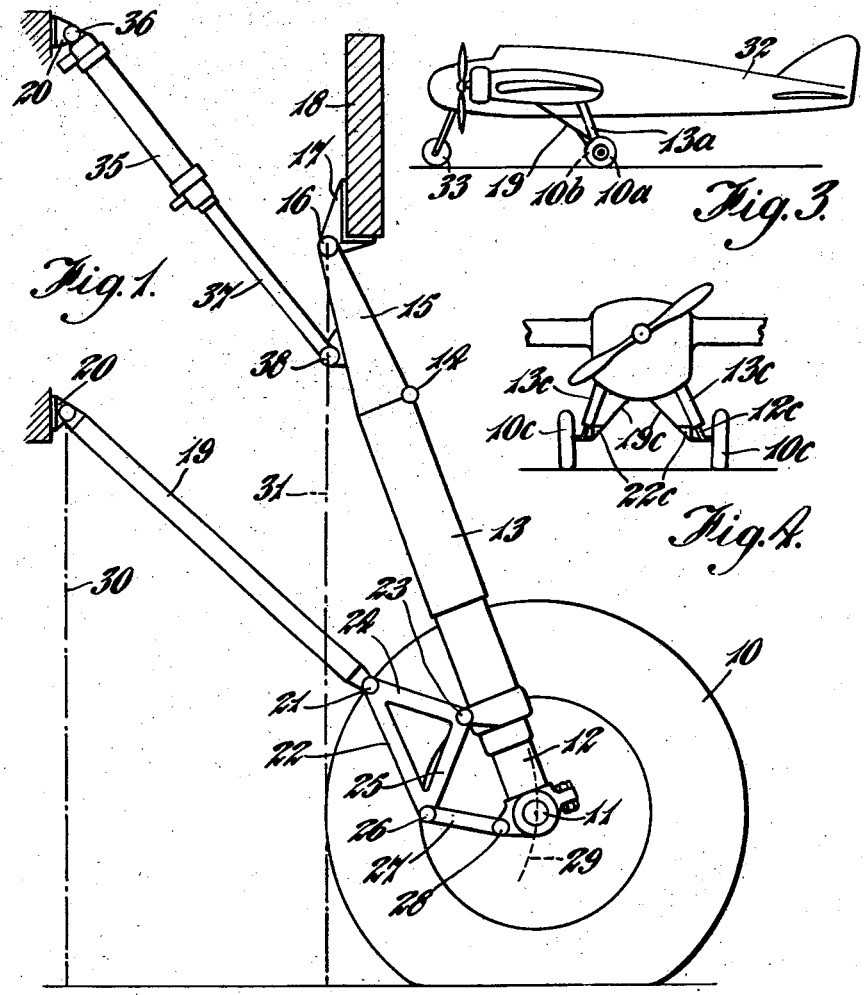
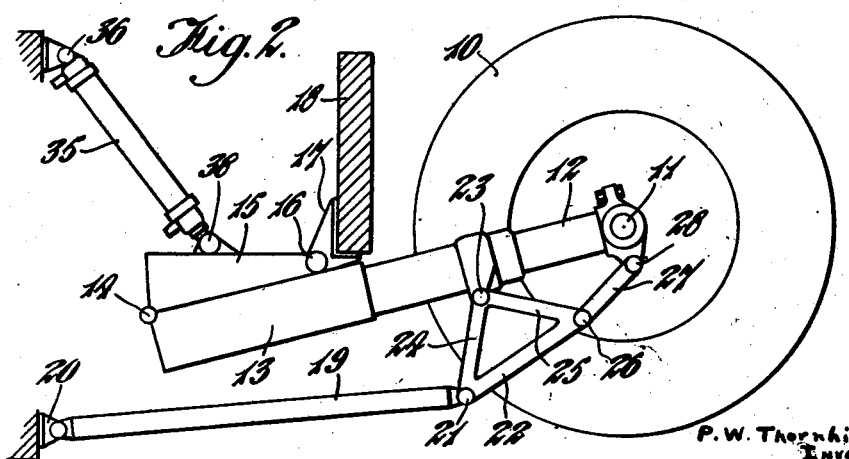

Patented Jan. 19, 1943

2,308,573

UNITED STATES PATENT OFFICE 2,308,573

LANDING GEAR FOR AIRCRAFT

Peter Warborn Thornhill, London, England, assignor to Automotive Products Company Limited, London, England Application April 6, 1940, Serial No. 328,369
In Great Britain April 12, 1939

8 Claims. (Cl. 244—102)

This invention relates to landing gear for aircraft, and it has for its object to provide an improved form of telescopic shock absorber mounting for landing wheels or equivalent, more particularly when the structural requirements of the aircraft necessitate the positioning of the shock absorber axis so that it is disposed obliquely forwards or rearwards or laterally with respect to the vertical when the aircraft is taxying. In particular the invention sets out to provide an improved form of mounting for an obliquely disposed telescopic shock absorber whereby the movement of the wheel axis or equivalent takes place in a substantially vertical direction, but it is not limited in this respect as it may be desirable in some cases to arrange for the wheel axis to move obliquely when the shock absorber axis is vertical.

In an aircraft landing gear having a telescopic shock absorbing strut with its upper "fixed" element pivotally connected with the aircraft and provided with a stay device, while the lower telescopically movable element carries the wheel or equivalent landing device, according to the invention a linkage connects each of the "fixed" and movable shock absorber elements to the stay device, whereby telescopic movement causes the shock absorber to rock about its upper mounting, but to an extent which is less than that which would occur if the stay device were connected directly with the movable element only of the shock absorber.

Further, in an aircraft landing gear having a telescopic shock absorbing strut, the upper "fixed" element of which is connected with the telescopically movable element thereof by a V-linkage, the present invention is characterised by the fact that the shock absorber is braced by a stay member extending from the aircraft to a position on the said V-linkage remote from the attachments of said linkage to the respective shock absorber elements. The term "fixed" is used in a relative sense, as of course the upper element of the usual telescopic shock absorber is pivotally connected with the aircraft and is thus capable of moving in an angular sense despite the fact that it is located against axial movement.

Thus an aircraft landing gear is provided having a telescopic shock absorbing strut supported by a stay member, which latter is connected with the "fixed" element of the shock absorber by a link member disposed out of line with the stay member when the shock absorber is in its normally loaded state, said stay member being operatively connected also with the movable element of the shock absorber whereby shortening of the shock absorber tends to bring the stay member and link member into alignment.

Further, in an aircraft landing gear having a telescopic shock absorbing strut with its upper "fixed" element pivotally connected with the aircraft and provided with a stay device, according to another aspect of the invention the lower end of said "fixed" element is connected with the telescopically movable element thereof by a V-linkage, and is also connected with the aircraft by another V-linkage which constitutes the stay device, the lower link of the latter being arranged to move as one with the upper link of the first mentioned V-linkage.

Moreover in an aircraft having an undercarriage including a telescopic shock absorbing strut and a stay member, which latter supports the shock absorber so that its axis is inclined to the vertical when the aircraft is on the ground, the present invention is characterised by the fact that the lower end of the stay member is connected with the upper "fixed" element of the shock absorber through the medium of a link, which is mechanically operated by the movable element of the shock absorber to control the action of the stay member, whereby the landing wheel or equivalent upon the telescopically movable element of the shock absorber is constrained to move along a substantially vertical path.

The lower end of the "fixed" element of the shock absorber may carry pivotally a bell crank lever or equivalent, one arm of which is pivoted at its outer end to the stay member, while the other arm constitutes one link of the V-linkage connecting said "fixed" element with the movable elements, said bell crank lever or equivalent conveniently comprising a member of triangular shape, said member being pivoted at its corners respectively to the stay member, to the "fixed" element of the shock absorber, and to a link attached at its other end to the movable element of the shock absorber. The upper "fixed" element of the shock absorber may be articulated by an elbow joint adapted to fold and enable the landing gear to retract, said elbow joint moving towards the pivotal attachment of the upper end of the stay member. With this arrangement a force to "break" the shock absorber about the elbow joint to cause retraction may be applied to that part of the shock absorber above said elbow joint and may act to move said part angularly about the pivotal axis of attachment of the upper end of the shock absorber to the aircraft.

The invention is illustrated by way of example in the accompanying diagrammatic drawing, in which:

Figure 1 represents a side elevation of one side of a retractable undercarriage with the landing wheel in its extended position;

Figure 2 is a corresponding view showing the wheel retracted;

Figure 3 is a side view of an aircraft drawn to a considerably reduced scale and showing the application of the invention to an undercarriage of the tricycle type; and Figure 4 is a fragmentary front elevation of aircraft having a modified form of undercarriage.

In the construction shown diagrammatically in Figures 1 and 2, a landing wheel 10 is pivotally mounted on a stub axle 11 carried at the lower ends of a pair of telescopic shock absorbing struts disposed one on each side of the wheel 10 to form a laterally rigid framework in the known manner. Each shock absorber comprises a plunger 12, which is mounted for axial sliding movement within a shock absorber cylinder 13; the latter constitutes the "fixed" element of the shock absorber and the plunger 12 is of course axially movable in respect thereto as shocks are received by the wheel 10 when the aircraft is taxying. In the example shown the upper end of the cylinder 13 is not connected directly with the aircraft but is pivoted by means of an elbow joint 14 with an upper member 15 which is itself pivotally mounted at 16 to a bracket 17 carried by the main spar 18 of the aircraft. This enables the landing wheel 10 to be retracted, as will be hereinafter explained.

A stay member 19 is pivotally connected at its upper end to a bracket 20 conveniently attached to the aircraft, while its lower end is pivoted at 21 to one corner of a triangular member 22, which later is pivoted at 23 to the lower end of the shock absorber cylinder 13 so as to act in the manner of a bell crank lever, the respective arms of which are indicated at 24 and 25. The extremity of the "arm" 25 is pivotally connected at 26 to a link 27, the opposite end of which is pivotally coupled at 28 to the fitting constituting the stub axle 11.

It will be seen that the "arm" 25 and the member 27 together constitute a V-linkage connecting the plunger 12 and the shock absorber cylinder 13 in such a manner as to enable axial movement to take place, while the "arm" 24 and the stay member 19 also act in the manner of a V-linkage serving to locate the lower end of the shock absorber cylinder 13. Thus as the wheel 10 moves upwards upon receiving a shock, the V-linkage 25, 27 moves towards its folded or closed position, thus causing the triangular member 22 to move angularly in a clockwise direction. This in turn has the effect of moving the V-linkage 24, 19 towards its straightened position and thus causes the lower end of the shock absorber cylinder 13 to be deflected towards the right. As upward axial movement of the plunger 12 tends to move the wheel 10 towards the left, these two movements substantially cancel one another, with the result that the wheel 10 follows a path which approximates to the vertical. With the arrangement shown this path is somewhat curved and the locus of the axis of the wheel 10 is indicated by the dotted line 29. It will be apparent that if, as in known arrangements, the stay member 19 were to be suitably extended and connected pivotally with the bottom of the plunger 12, the axis of the wheel 10 would move in an arc having as centre the bracket 20 at the upper end of the stay member 19, with the result that upward movement of the wheel 10, upon receiving a shock, would be accompanied by a decided movement towards the right. On the other hand, by connecting the lower end of the stay member 19 to the bottom of the cylinder 13, the latter would be held stationary, and upward movement of the wheel 10 would be accompanied by a certain travel towards the left on account of the obliquity of the axis of the shock absorber 12, 13, 15. The improved arrangement according to the invention thus enables the wheel 10 to move in a path intermediate these two known arrangements, which path can readily be arranged to lie in an approximately vertical direction despite the fact that the shock absorber axis is severely inclined. It will be seen that in the undercarriage shown in Figure 1 the axis of the shock absorber, regarded in a downward direction, extends obliquely with respect to the vertical in a direction away from a vertical line 30, passing through the upper pivotal attachment of the stay member 19 to the bracket 20. When a similar vertical line 31 is dropped from the pivotal axis at 16, it is clear that the axis of the wheel 10 lies decidedly outside the limits of the vertical projection of its attachment points 16 and 20 to the aircraft and yet, despite this fact, the wheel 10 is caused to move along a path which approximates to the vertical.

This effect can be utilised to advantage in several ways, and two examples are given in Figures 3 and 4. In Figure 3 an aircraft 32 is provided with an undercarriage of the tricycle type comprising a nose wheel 33 and a pair of main landing wheels 10a and 10b supported upon oblique shock absorbers, one of which is indicated at 13a. As is well known, undercarriages of this type are designed so that the centre of gravity of the aircraft is only very slightly in front of the landing wheels 10a, 10b, so that the aircraft may rock about said landing wheels as it takes off. Any movement of the main landing wheels 10a and 10b, either forwards or rearwards, on account of shocks during taxying, tends to upset this balance and is therefore undesirable. Such movement, however, is avoided by incorporating the linkage arrangement according to the invention.

In Figure 4 a pair of landing wheels 10c are mounted upon outwardly splayed telescopic shock absorbers 13c having stay members 19c connected by triangular members 22c with the shock absorber cylinders 13c and also the corresponding shock absorber plungers 12c in the manner previously described. Owing to the fact that the shock absorbers are outwardly inclined, a relatively wide wheel base is obtained and at the same time any movement of the wheels 10c on account of shock during taxying takes place in a vertical direction, thus avoiding dangerous side strain upon the tyres of the wheels.

With the construction shown in Figures 1 and 2 provision is made for retracting the undercarriage, a double acting hydraulic jack 35 having its upper end pivoted to a bracket at 36, while its plunger member 37 is pivoted at 38 to the upper member 15 of the shock absorber. By supplying working liquid to the jack 35 the latter is shortened, thus drawing the member 15 in an upward direction and causing the shock absorber as a whole to fold to the position shown in Figure 2, the action of course being assisted by the stay member 19, which pivots about its anchorage at 20. Thus the wheel 10 is drawn upwards to a position which is conveniently clear of the spar 18, as well as the points of attachment 20 and 36.

It will be appreciated that locking means would normally be provided for holding the undercarriage in its retracted and/or extended position, but such means have been omitted in the accompanying diagrammatic drawing. Further it might sometimes be necessary to provide additional stays to support the wheels in a direction at right angles to views shown, i. e. laterally in Figures 1 and 3, and in a fore and aft direction in Figure 4. In the retractable form of undercarriage shown in Figures 1 and 2 each wheel is supported in a framework comprising the pair of telescopic shock absorbers; the latter are thus rigidly braced together, and the pivotal mounting at their upper extremities is sufficiently long to secure the necessary lateral rigidity.

The invention is applicable to shock absorbing struts inclined in any desired sense, i. e. rearwardly, forwardly, laterally, or a combination of these, and may be utilised where an oblique movement is desired for a wheel or equivalent member which is mounted upon one or more vertical shock absorbers. Obviously the form and disposition of the locus of the wheel axis can be modified by varying the lengths and directions of the various members constituting the two V-linkages.

What I claim is:

1. Landing gear for aircraft comprising, a landing surface contacting device, a shock absorber including telescoping elements, means pivotally attaching one of said elements to a portion of the aircraft body, means attaching said device to the other element, a stay, means for pivotally attaching said stay to a portion of the aircraft body, means connecting the stay to that shock absorber element which is pivotally attached to the aircraft body, and means responsive to relative movement of said telescoping elements for varying the effective length of said stay proportionally to the amplitude of relative movement of said shock absorber elements, whereby to confine the movement of said device to a substantially vertical direction.

2. Landing gear for aircraft comprising, a landing surface contacting device, a shock absorber including a fixed element and a movable element mutually telescoping, means pivotally attaching said fixed element to a portion of the aircraft body, means attaching said device to the movable element, a stay, means pivotally attaching said stay to a portion of the aircraft body, means connecting said stay to said fixed element, and means responsive to movement of said movable element for varying the effective length of said stay upon compression of said shock absorber elements, whereby to confine the movement of the ground contacting landing device to a substantially vertical direction.

3. Landing gear for aircraft comprising, a landing surface contacting device, a shock absorber including a fixed element and a movable element mutually telescoping, means pivotally attaching said fixed element to a portion of the aircraft body, means attaching said device to the movable element, a stay, means pivotally attaching said stay to a portion of the aircraft body, means connecting said stay to said fixed element, a V-linkage connecting said elements, and means responsive to reduction of the angle defined by said V-linkage for varying the effective length of said stay, whereby to confine the movement of the ground contacting landing device to a substantially vertical direction.

4. Landing gear for aircraft comprising, a landing surface contacting device, a shock absorber including a fixed element and a movable element mutually telescoping, means attaching said device to said movable element, means pivotally attaching the fixed element to a portion of the aircraft body, a stay, means pivotally attaching said stay to a portion of the aircraft body, a bell crank pivotally attached to said fixed element, the free end of said stay being pivotally attached to one arm of said bell crank, and a link connecting the other arm of said bell crank and the movable element, means pivotally connecting said link to said bell crank and said movable element, whereby compression of the shock absorber will vary the effective length of the stay to maintain the device substantially in a vertical direction.

5. Landing gear for aircraft comprising, a landing surface contacting device, a shock absorber including a fixed element and a movable element mutually telescoping, means attaching said device to said movable element, means pivotally attaching the fixed element to a portion of the aircraft body, a stay, means pivotally attaching said stay to a portion of the aircraft body, a triangular bell crank, means pivotally attaching the apex of said bell crank to said fixed element, means pivotally attaching the free end of said stay to one arm of said bell crank, and a link extending from the other arm of said bell crank to the movable element, means pivotally connecting said link to said other arm of said bell crank and said movable element, whereby compression of the shock absorber will vary the effective length of the stay to maintain the device substantially in a vertical direction.

6. Landing gear for aircraft comprising, a landing surface contacting device, a shock absorber including telescoping elements, one of said elements being articulated by an elbow joint adapted to fold to permit retraction of the device, means pivotally attaching one end of said element to a portion of the aircraft body, means attaching said device to the other shock absorber element, a stay, means pivotally attaching said stay to a portion of the aircraft body, means connecting said stay to the articulated shock absorber element, the elbow joint of said element being movable toward the point of pivotal attachment of said stay member, means for varying the effective length of said stay proportionally to relative movement of said shock absorber elements, and means for normally holding said articulated element in alignment against collapsing under weight, said means being movable to fold said articulated element to cause retraction of said device.

7. Aircraft landing gear as claimed in claim 6 in which the means for holding the articulated element against collapse acts thereon at a point between the elbow joint and the point of pivotal attachment to the aircraft body.

8. Aircraft landing gear comprising, a telescopic shock absorbing strut, means pivotally attaching said strut at one end to the aircraft body, a landing surface contacting device, means connecting the landing surface contacting device with the end of said strut remote from the point of pivotal attachment to the aircraft body, a stay member, means pivotally attaching said member at one end to a portion of the aircraft body, means operatively connecting said stay member to the shock absorbing strut, said stay normally serving to maintain the shock absorbing strut in a position inclined to the vertical, and means operable in response to telescopic movement of the shock absorber for varying the effective length of the stay, whereby the landing surface contacting device is constrained to move along a substantially vertical path.

PETER WARBORN THORNHILL.